United States Patent
Eom et al.

(10) Patent No.: US 8,874,795 B2
(45) Date of Patent: Oct. 28, 2014

(54) DATA SYNCHRONIZATION SYSTEM

(75) Inventors: Hyeonsang Eom, Seoul (KR); Young Sang Kang, Seoul (KR); Heon Young Yeom, Seoul (KR); So-young Jeong, Seoul (KR); Gun-wook Kim, Goyang-si (KR); Kyung Park, Daejeon-si (KR)

(73) Assignees: Seoul National University Industry Foundation, Seoul (KR); Pantech Co., Ltd., Seoul (KR)

( * ) Notice: Subject to any disclaimer, the term of this patent is extended or adjusted under 35 U.S.C. 154(b) by 1111 days.

(21) Appl. No.: 11/947,489

(22) Filed: Nov. 29, 2007

(65) Prior Publication Data

US 2008/0130812 A1   Jun. 5, 2008

(30) Foreign Application Priority Data

Nov. 30, 2006   (KR) .................. 10-2006-0120044

(51) Int. Cl.
*G06F 15/16* (2006.01)
*G06F 17/30* (2006.01)
*H04L 12/26* (2006.01)
*H04L 12/801* (2013.01)

(52) U.S. Cl.
CPC .... *G06F 17/30578* (2013.01); *G06F 17/30345* (2013.01); *G06F 17/30575* (2013.01);
(Continued)

(58) Field of Classification Search
CPC ......... H04L 47/10; H04L 47/11; H04L 47/12; H04L 47/14; H04L 47/30; H04L 43/08; H04L 43/0876; G06F 17/30221; G06F 17/30345; G06F 17/30575; G06F 17/30578; G06F 17/3082; G06F 17/30194; G06F 17/30182; G06F 17/30067; G06F 17/30; G06F 17/301; G06F 17/30115; G06F 17/30117; G06F 17/3012; G06F 17/30123; H04W 56/00; H04W 56/001; H04W 56/002; H04W 56/003; H04W 56/0035; H04W 56/004; H04W 56/0045; H04W 56/005; H04W 72/00; H04W 72/02; H04W 72/04; H04W 72/048; H04W 72/0486; H04W 72/06; H04W 72/08
USPC ......... 709/206, 207, 213, 217, 248, 223, 218, 709/219, 224, 225, 226; 707/705, 790, 1, 2, 707/3, 4, 5, 100, 101, 102, 200, 201, 202, 707/203, 204, 634, 610, 620, E17.032, 707/E17.005, 624, 614, 619, E17.01, 625, 707/736, 752, 758, 821, 822, 823, 827; 710/21; 715/500.1, 515; 717/120, 121, 717/122, 123; 375/359
See application file for complete search history.

(56) References Cited

U.S. PATENT DOCUMENTS 5,870,765 A * 2/1999 Bauer et al. .................. 707/610
6,000,000 A * 12/1999 Hawkins et al. .............. 707/610
(Continued)

FOREIGN PATENT DOCUMENTS

KR   1020050046974   5/2005

OTHER PUBLICATIONS

Jonsson, et al., "SyncML—Getting the mobile Internet in sync", Ericsson Review, 2001, No. 3, pp. 110-115.

*Primary Examiner* — Saket K Daftuar
(74) *Attorney, Agent, or Firm* — H.C. Park & Associates, PLC

(57) ABSTRACT

A data synchronization system is provided. In the data synchronization system, a synchronization message transmitting party transmits a synchronization message with meta information to a synchronization message receiving party, and the synchronization message receiving party interprets and stores the meta information included in the synchronization message, and performs further processing for data that is to be synchronized, according to the meta information. Therefore, the frequency of wireless connections for synchronization is minimized.

17 Claims, 2 Drawing Sheets

(52) U.S. Cl.
CPC ............ *H04L 43/0876* (2013.01); *H04L 47/10* (2013.01); *G06F 17/30221* (2013.01)
USPC ........... 709/248; 709/217; 709/218; 709/219; 709/223; 709/224; 709/225; 709/226; 707/620; 707/624; 707/634; 707/610; 707/614; 707/619; 707/625; 707/736; 707/752; 707/758; 707/821; 707/822; 707/823; 707/827; 707/E17.01; 707/E17.032; 707/E17.005

(56) References Cited

U.S. PATENT DOCUMENTS

| | | | | |
|---|---|---|---|---|
| 6,170,005 B1 * | 1/2001 | Meandzija | | 709/217 |
| 6,529,921 B1 * | 3/2003 | Berkowitz et al. | | 715/201 |
| 6,738,789 B2 * | 5/2004 | Multer et al. | | 1/1 |
| 6,757,696 B2 * | 6/2004 | Multer et al. | | 1/1 |
| 6,854,016 B1 * | 2/2005 | Kraenzel et al. | | 709/229 |
| 6,934,727 B2 * | 8/2005 | Berkowitz et al. | | 715/201 |
| 6,993,522 B2 * | 1/2006 | Chen et al. | | 1/1 |
| 7,007,041 B2 * | 2/2006 | Multer et al. | | 1/1 |
| 7,089,307 B2 * | 8/2006 | Zintel et al. | | 709/224 |
| 7,124,204 B2 * | 10/2006 | Givoly et al. | | 709/248 |
| 7,139,858 B2 * | 11/2006 | Nakajima | | 710/300 |
| 7,249,229 B2 * | 7/2007 | Ogasawara et al. | | 711/154 |
| 7,308,642 B2 * | 12/2007 | Rapakko et al. | | 715/203 |
| 7,328,222 B2 * | 2/2008 | Keith et al. | | 1/1 |
| 7,363,332 B2 * | 4/2008 | Berkowitz et al. | | 707/639 |
| 7,409,379 B1 * | 8/2008 | Katzer | | 1/1 |
| 7,415,082 B2 * | 8/2008 | Beadle et al. | | 375/343 |
| 7,415,486 B2 * | 8/2008 | Multer | | 1/1 |
| 7,483,925 B2 * | 1/2009 | Koskimies et al. | | 1/1 |
| 7,490,170 B2 * | 2/2009 | Givoly et al. | | 709/248 |
| 7,516,165 B2 * | 4/2009 | Berkowitz et al. | | 1/1 |
| 7,529,780 B1 * | 5/2009 | Braginsky et al. | | 1/1 |
| 7,536,524 B2 * | 5/2009 | Shaath et al. | | 711/163 |
| 7,693,888 B2 * | 4/2010 | Urscheler et al. | | 707/634 |
| 7,779,169 B2 * | 8/2010 | Revah et al. | | 710/12 |
| 7,792,792 B2 * | 9/2010 | Witriol et al. | | 707/610 |
| 7,831,576 B2 * | 11/2010 | DeBie | | 707/705 |
| 7,900,050 B2 * | 3/2011 | Izu et al. | | 713/176 |
| 7,933,868 B2 * | 4/2011 | Singh et al. | | 707/625 |
| 7,945,540 B2 * | 5/2011 | Park et al. | | 707/692 |
| 2001/0044805 A1 * | 11/2001 | Multer et al. | | 707/201 |
| 2002/0010807 A1 * | 1/2002 | Multer et al. | | 709/328 |
| 2002/0042818 A1 * | 4/2002 | Helmer et al. | | 709/217 |
| 2002/0059299 A1 * | 5/2002 | Spaey | | 707/104.1 |
| 2002/0199024 A1 * | 12/2002 | Givoly et al. | | 709/248 |
| 2003/0028554 A1 * | 2/2003 | Koskimies et al. | | 707/201 |
| 2003/0105768 A1 * | 6/2003 | Berkowitz et al. | | 707/100 |
| 2003/0172054 A1 * | 9/2003 | Berkowitz et al. | | 707/1 |
| 2003/0233383 A1 * | 12/2003 | Koskimies | | 707/204 |
| 2004/0044799 A1 * | 3/2004 | Sivaraman et al. | | 709/253 |
| 2004/0205263 A1 * | 10/2004 | Sivaraman et al. | | 710/21 |
| 2005/0091240 A1 * | 4/2005 | Berkowitz et al. | | 707/100 |
| 2005/0149634 A1 * | 7/2005 | McKenney | | 709/248 |
| 2005/0216524 A1 * | 9/2005 | Gomes et al. | | 707/201 |
| 2005/0256909 A1 * | 11/2005 | Aboulhosn et al. | | 707/200 |
| 2006/0031264 A1 * | 2/2006 | Bosworth et al. | | 707/200 |
| 2006/0041600 A1 * | 2/2006 | Lehtola et al. | | 707/201 |
| 2006/0095481 A1 * | 5/2006 | Singh et al. | | 707/204 |
| 2006/0253624 A1 * | 11/2006 | Revah et al. | | 710/52 |
| 2007/0011298 A1 * | 1/2007 | Givoly et al. | | 709/223 |
| 2007/0094471 A1 * | 4/2007 | Shaath et al. | | 711/163 |
| 2007/0156842 A1 * | 7/2007 | Vermeulen et al. | | 709/217 |

* cited by examiner

DATA SYNCHRONIZATION SYSTEM

CROSS-REFERENCE TO RELATED APPLICATIONS

This application claims priority from Korean Patent Application No. 10-2006-0120044 filed on Nov. 30, 2006, the disclosure of which is incorporated herein in its entirety by reference.

BACKGROUND OF THE INVENTION

1. Field of the Invention

The present invention relates to a data synchronization system, and more particularly, to a technique for wireless data synchronization between a server and a client which can be connected to a wireless network.

2. Description of the Related Art

With development of wireless Internet technologies, a mobile computing environment where users can access data from anywhere at any time is becoming more distributed. Accordingly, users can use various applications including E-mail applications, planning applications, moving picture- and music-related applications, and address book applications, through desktop computers, or mobile devices, such as cellular phones, personal digital assistants (PDAs), or notebook computers. A user can distribute various data to the memory of a device, or copy and store various data in the memory of a device.

However, a mobile device is at risk of data loss because it can be easily lost or broken. For the reason, it is needed to back up data of a mobile device in the memory of a personal desktop computer or a specific server. However, since a user's mobile terminal is connected to a network only as necessary, due to accounting problems or network load problems, etc., data synchronization has to be performed periodically or non-periodically.

A user accesses a network periodically or non-periodically through his or her mobile terminal, transmits data changed in the mobile terminal to a storage server on the network, and receives updated data from the storage server on the network through the mobile terminal, thereby maintaining data synchronization. A representative data synchronization method is a data synchronization protocol, SyncML, defined by the Open Mobile Alliance (OMA).

FIG. 1 is a block diagram of a conventional data synchronization system. The data synchronization system consists of a first apparatus 10 and a second apparatus 20, which are connected to each other through a wireless network. The first apparatus 10 may be a client terminal, such as a cellular phone, a personal digital assistant (PDA), or a notebook computer, and the second apparatus 20 may be a server computer. On the contrary, it is also possible that the first apparatus 10 is a server computer and the second apparatus 20 is a client terminal.

The first apparatus 10 includes at least one application 11, a synchronization agent 12, a data storage unit 13, and a communication interface 14. The application 11 is a program for reading, processing, or storing synchronization data that is to be stored in the data storage unit 13. The synchronization agent 12 performs synchronization processing for the synchronization data that is to be stored in the data storage unit 13, according to a synchronization message transmitted from the second apparatus 20. The data storage unit 13 stores the synchronization data. The communication interface 14 is used to wirelessly connect the first apparatus 10 to the second apparatus 20.

The second apparatus 20 has the same construction as the first apparatus 10, and includes at least one application 21, a synchronization agent 22, a data storage unit 23, and a communication interface 24. Likewise, the application 21 is a program for reading, processing, or storing synchronization data that is to be stored in the data storage unit 23. The synchronization agent 22 performs synchronization processing for the synchronization data that is to be stored in the data storage unit 23, according to a synchronization message transmitted from the first apparatus 10. The data storage unit 23 stores the synchronization data. The communication interface 24 is used to wirelessly connect the second apparatus 20 to the first apparatus 10.

The data synchronization operation of the conventional data synchronization system as constructed above will be described below. For convenience of description, it is assumed that the first apparatus 10 is a client terminal, the second apparatus 20 is a server computer, and a user executes an application of managing an address book, edits the address book, and stores the edited address book in the data storage unit 13 of the first apparatus 10. The data storage unit 13 may be a flash memory of a mobile device.

After the address book is edited, the synchronization agent 12 is executed, and the first apparatus 10 is connected to the second apparatus 20 through the communication interface 14. The synchronization agent 12 can be executed manually by a user, or executed automatically by the system. The synchronization agent 12 generates a synchronization message, and transmits the synchronization message to the second apparatus 20. The second apparatus 20 interprets the synchronization message through the synchronization agent 22, and performs synchronization processing for synchronization data stored in the data storage unit 23.

The synchronization message includes data identification information for data that is to be synchronized, a synchronization command, and synchronization data. In this case, the data identification information for the data that is to be synchronized includes information about an address book, the synchronization command is an address book update command, and the synchronization data is edited address book data. The second apparatus 20 interprets the synchronization message through the synchronization agent 22, and stores the edited address book data in a location indentified by information indicating an address book stored in the data storage unit 23 according to the address book update command, thereby performing data synchronization processing.

However, in the conventional data synchronization system, when only some of data stored in a data storage unit need to be selectively synchronized, or when synchronization data needs to be processed not through a wireless network, the first apparatus 10 has to be wirelessly connected to the second apparatus 20, which increases user's accounting loads.

Accordingly, the present applicant proposes a method in which a synchronization message transmitting party transmits a synchronization message with meta information to a synchronization message receiving party so that it can be minimized the frequency of connections of the synchronization message receiving party to a wireless network for synchronization processing, user's accounting loads can be reduced, and synchronization processing can be effectively performed.

SUMMARY OF THE INVENTION

The present invention provides a data synchronization system in which a synchronization message transmitting party transmits a synchronization message with meta information to a synchronization message receiving party so that it can be minimized the frequency of connections of the synchronization message receiving party to a wireless network for synchronization processing, user's accounting loads can be reduced, and synchronization processing can be effectively performed.

According to an aspect of the present invention, there is provided a data synchronization system including: a first apparatus transmitting a synchronization message with meta information; and a second apparatus receiving the synchronization message with the meta information from the first apparatus, interpreting the meta information included in the synchronization message, storing the interpreted meta information, and performing further processing for data that is to be synchronized, according to the meta information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
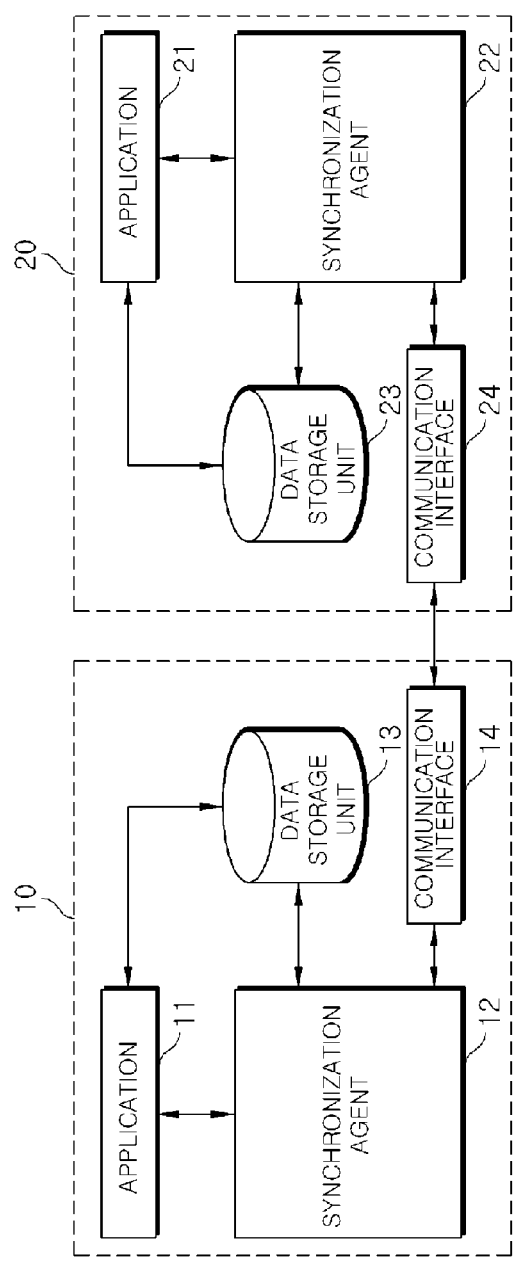
FIG. 1 is a block diagram of a conventional data synchronization system.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
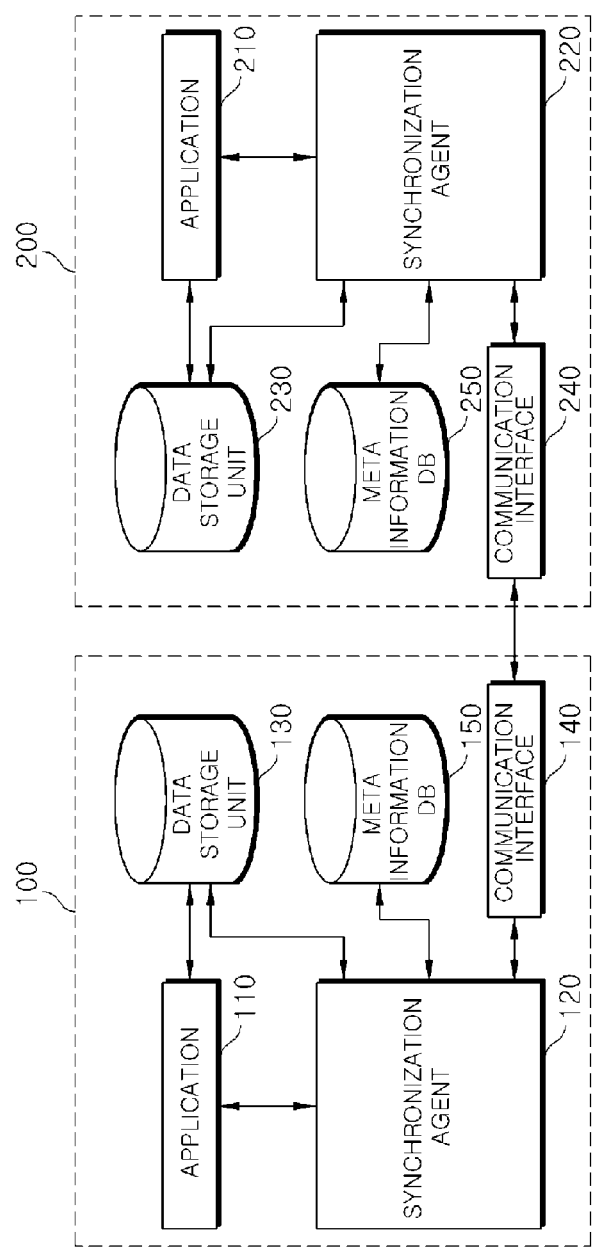
FIG. 2 is a block diagram of a data synchronization system according to an embodiment of the present invention.

FIG. 2 is a block diagram of a data synchronization system according to an embodiment of the present invention. The data synchronization system includes a first apparatus 100 and a second apparatus 200 which are connected to each other through a wireless network. The first apparatus 100 may be a client terminal, such as a cellular phone, a personal digital assistant (PDA), or a notebook computer, and the second apparatus 200 may be a server computer. On the contrary, it is also possible that the first apparatus 100 is a server computer and the second apparatus 200 is a client terminal.

The first apparatus 100 includes at least one application 110, a synchronization agent 120, a data storage unit 130, a communication interface 140, and a meta information database (DB) 150. The application 110 is a program for reading, processing, or storing synchronization data that is to be stored in the data storage unit 130. The synchronization agent 120 performs synchronization processing for synchronization data that is to be stored in the data storage unit 130, according to a synchronization message transmitted from the second apparatus 200. The synchronization agent 120 interprets meta information included in the synchronization message, stores the interpreted meta information in the meta information database 150, and performs further processing for data that is to be stored in the data storage unit 130 and will be synchronized, according to the meta information. The data storage unit 130 stores the synchronization data. The communication interface 140 connects the first apparatus 100 to the second apparatus 200 through a wireless network. The meta information database 150 stores the meta information included in the synchronization message.

The second apparatus 200 has the same construction as the first apparatus 100, and includes at least one application 210, a synchronization agent 220, a data storage unit 230, a communication interface 240, and a meta information database (DB) 250. The application 210 is a program for reading, processing, or storing synchronization data stored in the data storage unit 230. The synchronization agent 220 performs synchronization processing for synchronization data that is to be stored in the data storage unit 230, according to a synchronization message transmitted from the first apparatus 100. The synchronization agent 220 interprets meta information included in the synchronization message, stores the meta information in the meta information database 250, and performs further processing for data that is to be stored in the data storage unit 230 and will be synchronized, according to the meta information. The data storage unit 230 stores the synchronization data. The communication interface 240 connects the second apparatus 200 to the first apparatus 100 through the wireless network. The meta information database 250 stores the meta information included in the synchronization message. The operation of the data synchronization system constructed above will be described in detail below. It is assumed that the first apparatus 100 is a client terminal, the second apparatus 200 is a server computer, and data processed by a user through the first apparatus 100 is transmitted to the second apparatus 200 so that the data is synchronized with data stored in the second apparatus 200.

Data changed by a user through execution of the application 110 of the first apparatus 100 is stored in the data storage unit 130. The data stored in the data storage unit 130 is included in a synchronization message, is transmitted to the second apparatus 200, and is synchronized with data stored in the data storage unit 230 of the second apparatus 200. The first apparatus 100 and the second apparatus 200 are connected to the wireless network through the communication interfaces 140 and 240, respectively. The data storage unit 130 of the first apparatus 100 may be a flash memory of a client terminal (a mobile device), and the data storage unit 230 of the second apparatus 200 may be a hard disk of a server computer.

In order to synchronize the data stored in the data storage unit 130 with the data stored in the data storage unit 230 of the second apparatus 200, first, the synchronization message is generated. The synchronization message can be generated by the application 110 of the first apparatus 100 or by the synchronization agent 120 of the first apparatus 100. If the synchronization message is generated, the synchronization agent 120 of the first apparatus 100 is executed to transmit the synchronization message to the second apparatus 200, wherein the synchronization agent 120 can be executed manually by a user or automatically by the system. The synchronization message includes data identification information of data that is to be synchronized, a synchronization command, synchronization data, and meta information. The meta information included in the synchronization message is further information for the synchronization data that is to be synchronized, that is, information for selectively synchronizing only some of the data stored in the data storage unit 230 as necessary or information for processing the synchronization data not through the wireless network.

The second apparatus 200, which has received the synchronization message from the first apparatus 100, interprets the synchronization message through the synchronization agent 220, performs synchronization processing for the synchronization data stored in the data storage unit 230, interprets the meta information included in the synchronization message transmitted from the first apparatus 100, stores the meta information in the meta information database 250, and then performs processing for data that is to be synchronized, according to the meta information.

Since the meta information is used when further processing for data that is to be synchronized is needed, that is, when only some of data stored in the data storage unit 230 need to be selectively synchronized as necessary or when the synchronization data need to be processed not through the wireless network, it is possible to minimize the frequency of wireless connections for synchronization, through further processing for data that is to be synchronized using the meta information, thereby reducing user's accounting loads and effectively performing synchronization. In a conventional technique, since data synchronization is performed after the first apparatus is connected to the second apparatus through a network for such further processing, user's accounting loads increase.

The meta information may define a validity period of the synchronization data stored in the second apparatus 200. Also, the meta information may define the size of the synchronization data stored in the second apparatus 200. In this case, the meta information can define an operation that has to be performed when the size of the synchronization data stored in the second apparatus 200 reaches a predetermined size. Also, the meta information may define the data storage unit 130 of the first apparatus 100 as a cache of the data storage unit 230 of the second apparatus 200.

Also, the meta information may define a synchronization schedule of the synchronization data stored in the second apparatus 200. Also, the meta information may define an operation that has to be performed when an error occurs during synchronization of the synchronization data stored in the second apparatus 200. Also, the meta information may define processing of the synchronization data stored in the second apparatus 200. Here, the processing of the synchronization data may be one of compressing, encrypting, or indexing. The meta information may define that it is applied to a specific file, or that it is applied to all files in a specific folder or to all data items in the sub-folders of a specific folder.

The following embodiments explain various methods for attaching meta information of data items using meta tags based on the data synchronization protocol SyncML, wherein the data synchronization protocol SyncML is expanded so that a synchronization message includes meta information. In the embodiments, tags "ClientCache", "Server Cache", "TTL", "LocalOnly", "Quota", "Policy", "SyncPeriod", and "ConflictResolve" are defined. The tag "ClientCache" indicates that the corresponding meta information will be stored in a client storage unit, and the tag "ServerCache" indicates that the corresponding meta information will be stored in a server storage unit. Also, additional tags can be defined as necessary. Tags "1 Week", "1 Day", and "Every 00:00:00" for indicating periods or times, other than the above-mentioned tags, can be varied or expanded. Values, such as "True", "16 MB", "LRU", also can be varied or expanded. Other than the above-mentioned tags, meta information for data items can be appropriately defined as tags, and formats for representing values of the tags can be defined.

First Embodiment

A SyncML message according to the first embodiment fetches a data item "mms_001" from a second apparatus (a server), and stores the data item "mms_001" in a data storage unit of a first apparatus (a client) for a week. A tag "ClientCache" of the SyncML message includes information indicating the data storage unit of the client. By inserting a tag "TTL" into the tag "ClientCache", it can be defined how long the corresponding data item "mms_001" will be stored in the client. Information regarding a period can be defined in units of second/minute/hour/day/week/year. A folder or data item whose storage period is not defined by the tag "TTL" depends on settings of its parent folder. If the storage period of the folder or data item is not set in its parent folder, the folder or data item is maintained indefinitely as long as no processing is performed on the folder or data item. The SyncML message is generated by a client application. The client synchronization agent 120 interprets the tag "ClientCache" of the SyncML message and stores the interpreted result in its meta information database. In this embodiment, a data item "mms_001" is removed from the data storage unit of the client after one week elapses. When the data item "mms_001" is removed, content related to the data item "mms_001" is also removed from the meta information database of the client.

```
<SyncML>
  <SyncHdr>
    <VerDTD>1.0</VerDTD>
    <VerProto>SyncML/1.0</VerProto>
    <SessionID>1</SessionID>
    <MsgID>2</MsgID>
    <Target><LocURI>./Messaging/MMS</LocURI></Target>
    <Source><LocURI>./MMS</LocURI></Source>
  </SyncHdr>
  <SyncBody>
  <Get>
    <CmdID>1</CmdID>
    <Item>
      <Target>
        <LocURI>mms_001</LocURI>
      </Target>
    </Item>
    <Meta>
      <Type xmlns='syncml:netinf'>application/wap.mms-messge
      </Type>
      <ClientCache>
        <TTL>1 Week</TTL>
  </ClientCache>
    </Meta>
  </Get>
  </SyncBody>
</SyncML>
```

Second Embodiment

A SyncML message according to the second embodiment sends a data item "mms_010" of a first apparatus (a client) to a second apparatus (a server), and stores the data item "mms_010" in a data storage unit of the server for one day. A synchronization agent of the server receives the SyncML message from the client, interprets a tag "ServerCache" in the SyncML message to acquire the content of the tag "ServerCache", and stores the content in a meta information database of the server. After a predetermined time (that is, one day) elapses, the data item "mms_010" is removed from the data storage unit of the server, and content related to the data item "mms_010" is also removed from the meta information database of the server.

```
            <Put>
        <CmdID>2</CmdID>
        <Item>
        <Target>
            <LocURI>mms_010</LocURI>
        </Target>
        </Item>
        <Meta>
        <Type xmlns='syncml:netinf'>application/wap.mms-messge</Type>
            <ServerCache>
                <TTL>1 Day</TTL>
            </ServerCache>
        </Meta>
        </Put>
```

Third Embodiment

A SyncML message according to the third embodiment uses a cache "My Cache" of a first apparatus (a client), a maximum of 16 MB can be stored in the cache "My Cache" of the client, and LRU (Least Recently Used) is used as a replacement policy. In some cases, the cache "My Cache" is used only by the client, and needs not to be synchronized with a second apparatus (a server). In these cases, the cache "My Cache" is stored only in a data storage unit of the client using a tag "LocalOnly", and is not stored in the server. The size of the cache "My Cache" can be defined using a tag "Quota", and a replacement policy of the cache "My Cache" can be defined using a tag "Policy". In this embodiment, the size of the cache "My Cache" is 16 MB, and a replacement policy of the cache "My Cache" is LRU.

```
            <Add>
        <CmdID>5</CmdID>
        <Meta>
        <ClientCache>
            <LocalOnly>True</LocalOnly>
        <Quota>16MB</Quota>
        <Policy>LRU</Policy>
        </ClientCache>
        </Meta>
        <Item>
        <Source>
        <LocURI>./102</LocURI>
        <LocName>My Cache</LocName>
        </Source>
        </Item>
        </Add>
```

Fourth Embodiment

A SyncML message according to the fourth embodiment generates an "Address Book" of a first apparatus (a client), and synchronizes the "Address Book" of the client with that of a second apparatus (a server) every 00:00:00. However, there is a case where both the client and server are updated before next synchronization is performed after synchronization data stored in the client is synchronized with that of the server. In this case, it can be selected whether to maintain data of the client, whether to maintain data of the server, or whether to wait user's manipulation without synchronization. The current embodiment is to perform synchronization using data of the client.

```
            <Add>
        <CmdID>6</CmdID>
        <Meta>
        <ClientCache>
            <SyncPeriod>Every 00:00:00</ SyncPeriod >
        <ConflictResolve>ClientSide</ConflictResolve>
        </ClientCache>
        </Meta>
        <Item>
        <Source>
        <LocURI>./478</LocURI>
        <LocName>Address Book</LocName>
        </Source>
        </Item>
            </Add>
```

As described above, in the data synchronization system according to the present invention, since a synchronization message transmitting party transmits a synchronization message with meta information to a synchronization message receiving party, it can be minimized the frequency of connections of the synchronization message receiving party to a wireless network for synchronization processing, thereby reducing user's accounting loads and effectively performing synchronization processing.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:
1. A data synchronization system, comprising:
   a first apparatus,
      to transmit a synchronization message with meta information, and
      to perform a first synchronization processing of synchronization data; and
   a second apparatus including a data storage unit,
      to receive the synchronization message with the meta information from the first apparatus,
      to interpret the meta information included in the synchronization message,
      to perform a second synchronization processing of the synchronization data in response to the synchronization message,
      to retain the synchronization data in the data storage unit for a validity period defined based on the meta information, and
      to remove the synchronization data from the data storage unit when the synchronization data exceeds the validity period,
      wherein the meta information specifies select synchronization data for synchronization among available synchronization data to minimize frequency of wireless connections for synchronization.
2. The data synchronization system of claim 1, wherein the meta information further defines a size of the synchronization data that is to be synchronized.
3. The data synchronization system of claim 1, wherein the meta information defines a synchronization data storage unit of the first apparatus as a cache for a synchronization data storage unit of the second apparatus.
4. The data synchronization system of claim 1, wherein the meta information defines an operation that is to be performed if an error occurs during either the first or second synchronization processing of the synchronization data that is to be synchronized.

5. The data synchronization system of claim 1, wherein the meta information defines either the first or second synchronization processing of the synchronization data that is to be synchronized.

6. A data synchronization system of claim 1,
wherein the meta information defines either the first or second synchronization processing of the synchronization data that is to be synchronized, and the defined synchronization processing of the synchronization data that is to be synchronized is one of compressing and encrypting.

7. A data synchronization system of claim 1,
wherein the meta information selectively defines partial data from the synchronization data stored in the data storage unit.

8. The data synchronization system of claim 1, wherein the meta information selectively defines synchronizing some but not all of the synchronization data stored in the data storage unit.

9. The data synchronization system of claim 1,
wherein the second apparatus further removes the interpreted meta information when the synchronization data exceeds the validity period.

10. A data synchronization system, comprising:
a first apparatus to transmit a synchronization message with meta information; and
a second apparatus including data storage unit,
to receive the synchronization message with the meta information from the first apparatus,
to interpret the meta information included in the synchronization message,
to synchronize data specified by the meta information, and
to retain the synchronized data in the data storage unit until expiration of a validity period,
wherein the validity period is defined based on the meta information, and
wherein the meta information specifies select synchronization data for synchronization among available synchronization data to minimize frequency of wireless connections for synchronization.

11. A selective data synchronization system, comprising:
a first apparatus
to transmit a synchronization message with meta information; and
a second apparatus,
to receive the synchronization message with the meta information from the first apparatus,
to interpret the meta information included in the synchronization message,
to perform a synchronization processing of select data based on the meta information, and
to store the synchronized data in a data storage unit of the second apparatus,
wherein the meta information specifies select synchronization data for synchronization among available synchronization data to minimize frequency of wireless connections for synchronization.

12. The data synchronization system of claim 1, wherein the synchronization data is not processed through a wireless network.

13. The data synchronization system of claim 10, wherein the first apparatus performs synchronization processing of select data to be synchronized.

14. The data synchronization system of claim 10, wherein the synchronization data is not processed through a wireless network.

15. The data synchronization system of claim 1, wherein the second synchronization processing is performed using the meta information and not through the wireless network.

16. The data synchronization system of claim 15, wherein the second synchronization processing is performed without increasing frequency of wireless connections for synchronization prior to the second synchronization processing.

17. The data synchronization system of claim 1, wherein the meta information specifies select synchronization data for synchronization to reduce accounting load of the second apparatus.

* * * * *